Patented Dec. 25, 1945

2,391,829

UNITED STATES PATENT OFFICE 2,391,829

DEHYDRATED SOUP

Louis J. Huber, Minneapolis, Minn., assignor to General Mills, Inc., a corporation of Delaware No Drawing. Application January 9, 1943, Serial No. 471,879

10 Claims. (Cl. 99—124)

The present invention relates to the preparation of a purée-type dehydrated soup. By the term "purée-type soup" as used herein it is intended to include products in which the insoluble vegetable base material is in comminuted form, while flavoring materials, such as particles of meat or onions, celery, and the like, may or may not be in the same finely divided state as the base material.

Precooked dehydrated soup products are simple to convert into a soup ready to serve. It is merely necessary to suspend them in water and heat them to a suitable temperature for eating. This is a considerable advantage over the method of preparing soups from the dried raw vegetables themselves which may require 3–6 hours, particularly in the case of soups from dried peas and beans. This advantage of precooked soups has caused consumer preference for this type of product. Commercially available precooked dehydrated soup products have been in the form of powder. In converting such a product into a soup, lumping frequently occurs. In order to prevent lumping, careful supervision and almost constant stirring are necessary.

The present invention presents a solution for this problem by providing a novel precooked soup product in a novel form which can be converted into a soup without the lumping problem attendant present commercially available products. In general, the invention involves the cooking of various vegetable materials, such as peas, beans, carrots, corn, onions, asparagus, celery, and the formation of a stiff dough therefrom. The stiff dough is then formed into discrete particles which are then dried. Physically, the ultimate product is composed of a large number of very finely divided vegetable particles which have been agglomerated into larger particles. These larger particles may be held together by the adhesive qualities of the vegetable material itself or may be held together by means of an added binder such as starch, gums, etc. In the preparation of soup from the dehydrated product, it is merely necessary to add the dehydrated product to water, either hot or cold, and to bring the water to a boil. The agitation produced by the ebullition is sufficient to agitate these large agglomerates or aggregates of dehydrated soup and to keep them more or less in suspension as they disintegrate. In this way it is possible to prepare a product free from lumps without stirring. The form of the ultimate product may be varied considerably. It may be in the form of pellets, short or long filaments, ribbons, disks, flakes, and the like. Any form which is composed of a large number of finely divided vegetable particles agglomerated together is suitable for the present purpose. Any of these forms will disintegrate gradually during the heating operation to yield a homogenous product free from lumps without the necessity for constant stirring which is encountered in the use of a powdered product.

The following examples will serve to illustrate the invention:

Example 1

A dough was formed from the following ingredients:

|  | Grams |
|---|---|
| Finely comminuted pea flour | 150 |
| Tapioca | 20 |
| Corn cones | 20 |
| Mixed seasoning | 20 |
| Water | 150 |

This dough was cooked for 1 hour in a dough mixing machine in which the dough was worked during the cooking process. After the cooking operation, the dough was extruded through a die to form long filaments. Part of the filaments were dried to a suitable moisture content and were used in that form. The remainder of the filaments were partially dried and then flattened to form ribbons which were further dried to a desirable ultimate moisture content. Each of these products, the filaments and the ribbons, readily disintegrated upon being heated in water and resulted in a product of homogenous consistency. The dehydrated product had been completely cooked in the course of its preparation, and the preparation of the liquid soup merely involved the disintegration of the dehydrated product in water and heating to a temperature desirable for eating.

This particular example and those which follow were prepared to provide a soup which would contain about 100 grams of the dehydrated product in 2 cups of water. It will be readily appreciated that individual preference as to the consistency of a soup of this type varies widely. Accordingly, the soup product may be used in any proportion desired. The seasoning content of this example was likewise designed for the production of a soup of the above concentration. If the soup product is used in a different concentration, it will be evident that the seasoning concentration may no longer be optimum, necessitating perhaps some additional seasoning. It will be apparent, however, that it is possible to prepare a product that will have the right amount of seasoning at the concentration recommended for use.

Example 2

A bean soup was prepared from the following ingredients:

| | Grams |
|---|---|
| Fine bean flour | 150 |
| Tapioca | 20 |
| Corn flour | 20 |
| Mixed seasoning | 20 |
| Water | 150 |

These ingredients were formed into a dough and were cooked in the same manner as the previous example. After cooking, the dough was extruded in fine vermicelli-like filaments and dried. The product had physical properties similar to the previous example.

Example 3

Another pea soup was made of the following ingredients:

| | Grams |
|---|---|
| Pea flour | 150 |
| Mixed seasoning | 20 |
| Water | 145 |

The above ingredients were mixed and processed in the same manner as the previous examples and yielded a product of similar physical characteristics. The absence of the starch binder improved the flavor of the product. At the same time no difficulty was experienced in forming the product into the desired form.

It has been found that some loss of flavor results from the prolonged subjection of the flavoring ingredients to the elevated temperature involved in the cooking operation. It was found desirable, therefore, to omit the flavoring ingredients from the dough during the cooking operation and to add them to the dough just prior to extrusion. The dough is then worked sufficiently prior to extrusion to thoroughly disseminate the flavoring uniformly.

Instead of cooking the vegetable material in the form of a dough, it is possible to cook the vegetable material in any desirable manner and to disintegrate the cooked material so as to break up its natural cellular structure and then form it into the desired shape. The dehydrated product thus produced which is composed of an agglomerate or aggregate of finely divided particles may readily disintegrate into finely divided particles upon being heated in water. The following is an example of this modification of the invention.

Example 4

2470 grams of green split peas were blanched and then steamed for about 45 minutes. 585 grams of uncooked green split peas were roasted for 45 minutes and then cooled and ground. The roasted peas, together with about 300 grams of mixed seasoning, were mixed with the cooked peas and the entire mixture blended. This mixture was then run through a grater-grinder which ground up the cooked peas into small particles and then extruded the entire mixture into the form of short filaments. The moisture from the steamed peas was sufficient to make the mixture plastic. The filaments were then dried to a moisture content of around 4%. In preparing the soup, about 100 grams of the dehydrated material were added to 2 cups of boiling water and heat was applied until the mixture again reached the boiling point. The filaments readily disintegrated without the formation of any lumps.

It has been found that the dehydrated product more readily disintegrates in water when it is in the form of ribbons, flakes, or the like, as distinguished from the pellets, filaments, etc. The increased area per unit weight is apparently responsible for this ease of disintegration. A cylindrical filament, however, gives greater mechanical strength, resulting in the formation of less powder during packaging and shipment and at the same time disintegrates sufficiently fast to meet all practical requirements. It is preferred, therefore, that the particles be in a form having substantial mechanical strength to prevent dusting. While it is preferred to thoroughly cook the vegetable material in the preparation of the dehydrated soup product, it will be apparent that such complete cooking is not absolutely essential. It is evident, however, that if the vegetable material is not completely precooked, the time involved in preparing the ultimate product will be lengthened. It is, therefore, preferred that the precooking be done at least to a substantial extent in preparing the dehydrated product. The terms "cooking" and "cooked" in the appended claims are intended to include either partial or complete cooking.

I claim as my invention:

1. Process of preparing a dehydrated purée-type soup product which is free from substantial quantities of added fat which comprises forming a cooked soup base containing vegetable material in which the natural tissue structure of the vegetable material is disrupted, forming the cooked soup base into aggregates of large surface area per unit weight, said aggregates being composed of a large number of small particles, said particles being held together by the adhesive qualities of the vegetable material, and drying the aggregates.

2. Process of preparing a dehydrated purée-type soup product which is free from substantial quantities of added fat which comprises forming a dough of comminuted vegetable base material and water, cooking the dough, forming the cooked dough into aggregates of large surface area per unit weight, said aggregates being composed of a large number of small particles, said particles being held together by the adhesive qualities of the vegetable material, and drying the aggregates.

3. Process of preparing a dehydrated purée-type soup product which is free from substantial quantities of added fat which comprises cooking vegetable base material, breaking up the natural tissue structure of the base material, forming the base material into aggregates of large surface area per unit weight, said aggregates being composed of a large number of small particles, said particles being held together by the adhesive qualities of the vegetable material, and drying the aggregates.

4. Process of preparing a dehydrated purée-type soup product which is free from substantial quantities of added fat which comprises forming a cooked soup base containing vegetable material in which the natural tissue structure of the vegetable material is disrupted, forming the cooked soup base into filaments composed of a large number of small particles, said particles being held together by the adhesive qualities of the vegetable material, and drying the filaments.

5. Process of preparing a dehydrated purée-type soup product which is free from substantial quantities of added fat which comprises forming a cooked soup base containing vegetable material in which the natural tissue structure of the vegetable material is disrupted, forming the cooked soup base into ribbons composed of a large number of small particles, said particles being held together by the adhesive qualities of the vegetable material, and drying the ribbons.

6. A process of preparing a dehydrated purée-type soup product which is free from substantial quantities of added fat which comprises cooking, breaking up the natural tissue structure of, and forming vegetable base material into flakes which are aggregates composed of a large number of small particles held together by the adhesive qualities of the vegetable material, and drying the flakes.

7. A dehydrated purée-type soup product which is free from substantial quantities of added fat comprising an aggregate of cooked vegetable base material of large surface area per unit weight, said aggregate no longer possessing the natural tissue structure of the vegetable base material and being composed of a large number of small particles held together by the adhesive qualities of the vegetable material and capable of disintegrating into small particles upon being heated in water.

8. A dehydrated purée-type soup product which is free from substantial quantities of added fat in the form of flakes, each flake comprising an aggregate of cooked vegetable base material of large surface area per unit weight, said aggregate no longer possessing the natural tissue structure of the vegetable base material and being composed of a large number of small particles held together by the adhesive qualities of the vegetable material and capable of disintegrating into small particles upon being heated in water.

9. A dehydrated purée-type soup product which is free from substantial quantities of added fat in the form of filaments, each filament comprising an aggregate of cooked vegetable base material of large surface area per unit weight, said aggregate no longer possessing the natural tissue structure of the vegetable base material and being composed of a large number of small particles held together by the adhesive qualities of the vegetable material and capable of disintegrating into small particles upon being heated in water.

10. A dehydrated purée-type soup product which is free from substantial quantities of added fat in the form of ribbons, each ribbon comprising an aggregate of cooked vegetable base material of large surface area per unit weight said aggregate no longer possessing the natural tissue structure of the vegetable base material and being composed of a large number of small particles held together by the adhesive qualities of the vegetable material and capable of disintegrating into small particles upon being heated in water.

LOUIS J. HUBER.